(12) United States Patent
Rebière

(10) Patent No.: US 11,518,240 B2
(45) Date of Patent: Dec. 6, 2022

(54) ELECTRIC WHEEL END ASSEMBLY

(71) Applicant: AxleTech International IP Holdings, LLC, Troy, MI (US)

(72) Inventor: Guillaume Rebière, Marcenod (FR)

(73) Assignee: AxleTech International IP Holdings, LLC, Troy, MI (US)

( * ) Notice: Subject to any disclaimer, the term of this patent is extended or adjusted under 35 U.S.C. 154(b) by 0 days.

(21) Appl. No.: 17/517,900

(22) Filed: Nov. 3, 2021

(65) Prior Publication Data

US 2022/0134875 A1 May 5, 2022

(30) Foreign Application Priority Data

Nov. 4, 2020 (EP) .................................... 20205802

(51) Int. Cl.
*B60K 17/04* (2006.01)
*B60K 7/00* (2006.01)
*F16H 1/28* (2006.01)

(52) U.S. Cl.
CPC .......... *B60K 17/046* (2013.01); *B60K 7/0007* (2013.01); *B60K 2007/0038* (2013.01); *B60K 2007/0092* (2013.01); *F16H 2001/2881* (2013.01)

(58) Field of Classification Search
CPC ................ B60K 17/046; B60K 7/0007; B60K 2007/0038; B60K 2007/0092; F16H 2001/2881
See application file for complete search history.

(56) References Cited

U.S. PATENT DOCUMENTS

| 3,770,074 | A | * | 11/1973 | Sherman | B60L 3/0061 180/370 |
| 4,662,246 | A | * | 5/1987 | Cheek | B62D 55/125 475/331 |
| 6,367,571 | B1 | | 4/2002 | Schwartz | |
| 8,662,277 | B2 | | 3/2014 | Schoon | |

FOREIGN PATENT DOCUMENTS

| CN | 102991344 A | * | 3/2013 | ........... B60K 17/046 |
| EP | 2481621 A1 | | 8/2012 | |
| WO | WO-2014065851 A1 | * | 5/2014 | ......... B60B 27/0021 |

OTHER PUBLICATIONS

European Search Report dated Feb. 22, 2021 for related European Appln. No. 20205802.0; 9 Pages.

\* cited by examiner

*Primary Examiner* — Justin Holmes
(74) *Attorney, Agent, or Firm* — Brooks Kushman PC

(57) ABSTRACT

An electric wheel-end assembly comprising a mounting portion, a spindle having an inboard end connected to the mounting portion and an outboard end distal from the mounting portion. A hub is rotatably mounted to the spindle via one or more bearings disposed between the inboard and outboard ends of the spindle. A reduction gearbox is disposed at the distal end of the spindle. An input shaft comprising an inboard end having a drive receiving portion arranged to releasably connect to a drive shaft of an electric motor, extends through the spindle to deliver a rotational input to the drive input of the reduction gearbox, the drive output of the reduction gearbox being connected to the hub to drive the hub in rotation about the spindle.

16 Claims, 4 Drawing Sheets

ELECTRIC WHEEL END ASSEMBLY

TECHNICAL FIELD

The invention relates to an electric wheel end assembly for transmitting torque from an electric motor to a wheel hub. In particular the invention relates to gearbox and braking arrangements for such a wheel end.

BACKGROUND

Wheel end assemblies are subject to a number of design constraints. Their diametric and longitudinal dimensions are limited by the size of wheel to be mounted to the hub end assembly and space to accommodate their longitudinal length can be limited by overall vehicle packaging factors. These size constraints can result in limited load carrying capacity and a limited capacity to transmit and generate torque at the hub. The size, power and configuration of motor integrated into or connected to the electric wheel end assembly can also place limits on the overall performance of the wheel and assembly.

There exists a need for improvement in wheel end assemblies.

SUMMARY

The inventors have identified an advantageous architecture for an electric wheel end assembly, achieving a particularly beneficial combination of size, load capacity, and speed reduction/torque amplification. Further, an advantageous braking arrangement has also been identified by the inventors.

The electric wheel end assembly disclosed herein is particularly well adapted for use with a range of different motor models and sizes due to the architecture efficiently providing a large reduction ratio through its two stage planetary gearbox arrangement, along with a compact overall diameter, and the gearbox being disposed outside of the spindle arrangement such that the dimensions of input shaft and spindle can be relatively close to allow for a compact overall arrangement. An efficient means for packaging and input shaft braking arrangement within a spindle and/or mounting portion/mounting plate of the wheel end assembly has also been devised. Such a braking arrangement can allow for ease of maintenance and replacement/assembly of the braking arrangement in the electric wheel end.

According to one aspect of the present invention, there is provided an electric wheel-end assembly comprising any or all of the following features: a mounting portion; a spindle having an inboard end connected to the mounting portion and an outboard end distal from the mounting portion; a hub, rotatably mounted to the spindle via one or more bearings disposed between the inboard and outboard ends of the spindle; a 2-stage planetary reduction gearbox disposed at the distal end of the spindle and having a drive input and a drive output; and an input shaft comprising an inboard end having a drive receiving portion arranged to releasably connect to a drive shaft of an electric motor, the input shaft extending through the spindle to deliver a rotational input from the drive receiving portion to the drive input of the reduction gearbox, the drive output of the reduction gearbox being connected to the hub, to drive the hub in rotation about the spindle.

The wheel end assembly of the invention is particularly suited to providing a compact overall assembly and providing a suitable reduction ratio between motor and hub.

The input shaft may comprise an outboard end connected to the input to the reduction gearbox. The input shaft may comprise a coupling sleeve. The input shaft may further comprise an outboard portion. The coupling sleeve may have an outboard end releasably coupled to the outboard portion of the input shaft within the spindle. The coupling sleeve may comprise an inboard end comprising the drive receiving portion arranged to connect to a drive shaft of an electric motor. The provision of a separate coupling sleeve in the spindle permits ease of assembly of the wheel end with a range of motor types without a need to change the design of the wheel end for each motor type.

The electric wheel-end assembly may further comprise at least one input shaft bearing disposed in a bore of the spindle, to rotatably support the outboard portion of the input shaft. The input shaft bearing may be disposed axially between inboard and outboard ends of the outboard portion. Such a bearing allows the outboard portion to be rotatably supported in the spindle while the coupling sleeve can be removed and replaced without disturbing the outboard portion of the input shaft.

The electric wheel-end assembly may further comprise an input shaft oil seal disposed in a bore of the spindle, axially between inboard and outboard ends of the outboard portion of the input shaft, and arranged to provide a seal between the outboard portion of the input shaft and the spindle. The oil seal acts to isolate the coupling sleeve from the wet parts of the gearbox, so that the coupling sleeve can be removed or replaced without unsealing the wet parts or disturbing seals.

The 2-stage planetary reduction gearbox may comprise any or all of the following features: a first planetary stage comprising a first sun gear and a plurality of first planet gears rotatably mounted to a first stage planet carrier; a second planetary stage, comprising a second sun gear, and a plurality of second planet gears rotatably mounted to a second stage planet carrier; the first stage planet carrier being connected to the sun gear of the second stage; wherein at least one of the first and second stages comprises axial thrust bearings arranged between the respective planetary gears and the respective planet carrier.

The thrust bearings can allow a stage to operate at high speed without undue wear, and so can extend the life of the gearbox. The thrust bearings are preferably provided on the first stage. This permits the first stage to operate at the necessary higher speeds and lower torques than the second stage, which operates at lower speed and higher torque.

The electric wheel-end assembly may further comprise one or more shims arranged between the axial thrust bearings and the respective planet carrier, the shims having a hardness greater than that of the planet carrier. The shims can further increase the durability of the gearbox.

The electric wheel-end assembly may further comprise a service brake arranged to apply a braking force to the hub with respect to the spindle.

The electric wheel-end assembly may further comprise an input shaft braking arrangement disposed at least partially within the spindle and arranged to brake the input shaft with respect to the spindle.

According to further aspect of the present invention, there is provided an electric wheel-end assembly comprising: a mounting portion; a spindle having an inboard end fixed to the mounting portion and an outboard end distal from the mounting portion; a hub, rotatably mounted to the spindle via one or more bearings; a gearbox disposed at the distal end of the spindle and having a drive input and a drive output; and an input shaft comprising an inboard end having a drive receiving portion arranged to releasably connect to a drive shaft of an electric motor, the input shaft extending through the spindle to deliver a rotational input from the drive receiving portion to the input of the gearbox, the output of the reduction gearbox being connected to the hub, to drive the hub in rotation about the spindle; and an input shaft braking arrangement disposed at least partially within the spindle and arranged to brake the input shaft with respect to the spindle.

An input shaft braking arrangement can efficiently provide a parking or service brake as an addition or as an alternative to a brake provided for more direct braking of the hub relative to the spindle.

The input brake assembly may comprise: at least one static braking member mounted within a bore of the spindle; at least one rotatable braking member mounted to the input shaft; and actuation means arranged to actuate the static and rotatable braking members to brake the input shaft with respect to the spindle.

The actuating means may comprise a biasing means arranged to bias the input brake toward an engaged position. An actuator may be arranged provide a force opposing the biasing means, to release the input brake. The input brake may be a normally-on type brake. The biasing means may be arranged within a piston of the actuating means. The actuating means may comprise an annular piston arranged about the input shaft.

The piston may be slidably received in a bore within the mounting portion or the spindle. The actuating means may further comprise a fluid chamber arranged to actuate the piston when pressure is applied within the fluid chamber, preferably to release the input shaft brake.

The input brake assembly and the inboard end of the spindle and mounting portion may be arranged so that the input braking assembly can be assembled by introducing components of the input braking assembly axially into a bore of the spindle from the inboard end. The components may be retained in place by a retainer component applied at the inboard end of the spindle and mounting portion.

BRIEF DESCRIPTION OF THE DRAWINGS

Further features and advantages of the present invention will become apparent from the following description of embodiments thereof, presented by way of example only, and by reference to the drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
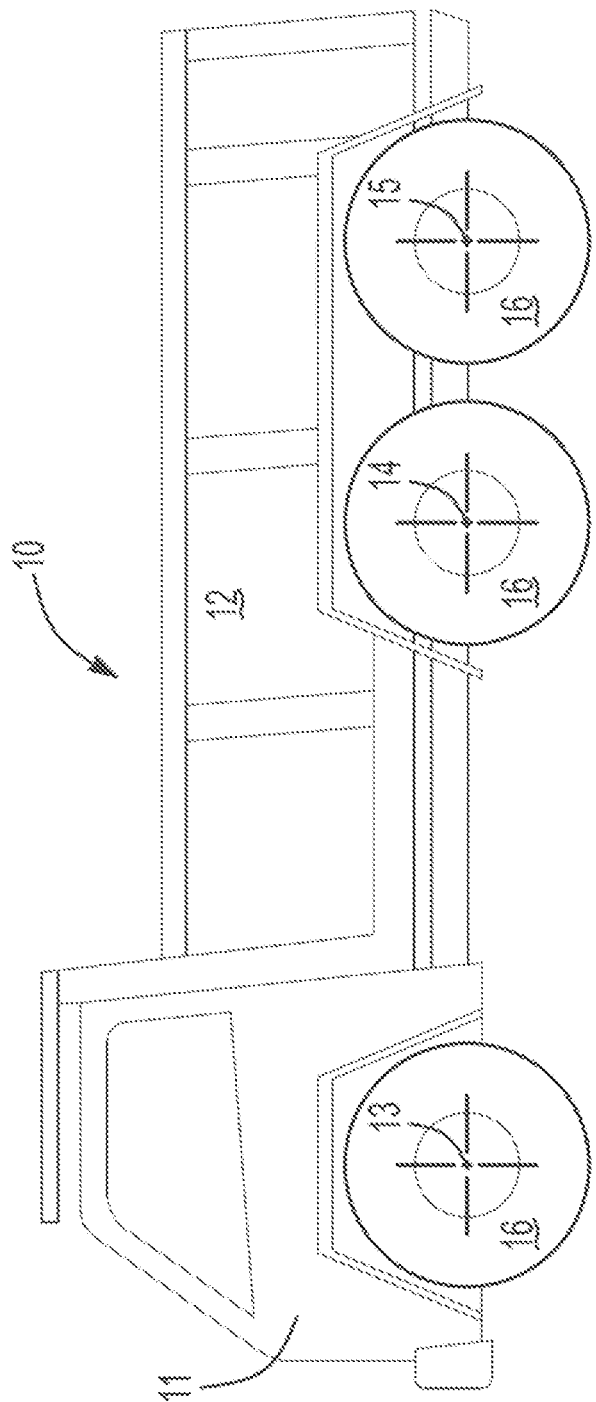
FIG. 1 shows a vehicle into which an electric wheel end of the present disclosure may be integrated.

FIG. 1 illustrates a vehicle 10 into which an electric wheel end according to the present disclosure may be integrated. The vehicle has a cab 11 and may incorporate a cargo or passenger carrying region 12. While FIG. 1 illustrates a cargo or passenger-carrying vehicle, the wheel-end of the present disclosure can be incorporated into any suitable type of vehicle requiring an electric wheel end assembly of the kind described herein. It can be desirable to drive such a vehicle from electric power sources. To achieve this, connection of individual electric motors to each wheel 16 the vehicle may be desirable. An electric wheel end assembly can be incorporated into one or more hubs 13, 14, 15 of the vehicle 10 in order to transmit drive from an electric motor to a wheel 16. Electric wheel end assemblies can be incorporated into non-steerable wheels 14, 15. Alternatively, by incorporating an electric wheel end assembly as disclosed herein into a steering knuckle, it is possible to directly drive steerable wheels 13 from an electric motor connected to the wheel via an electric wheel end assembly as described herein.

Figure 2:
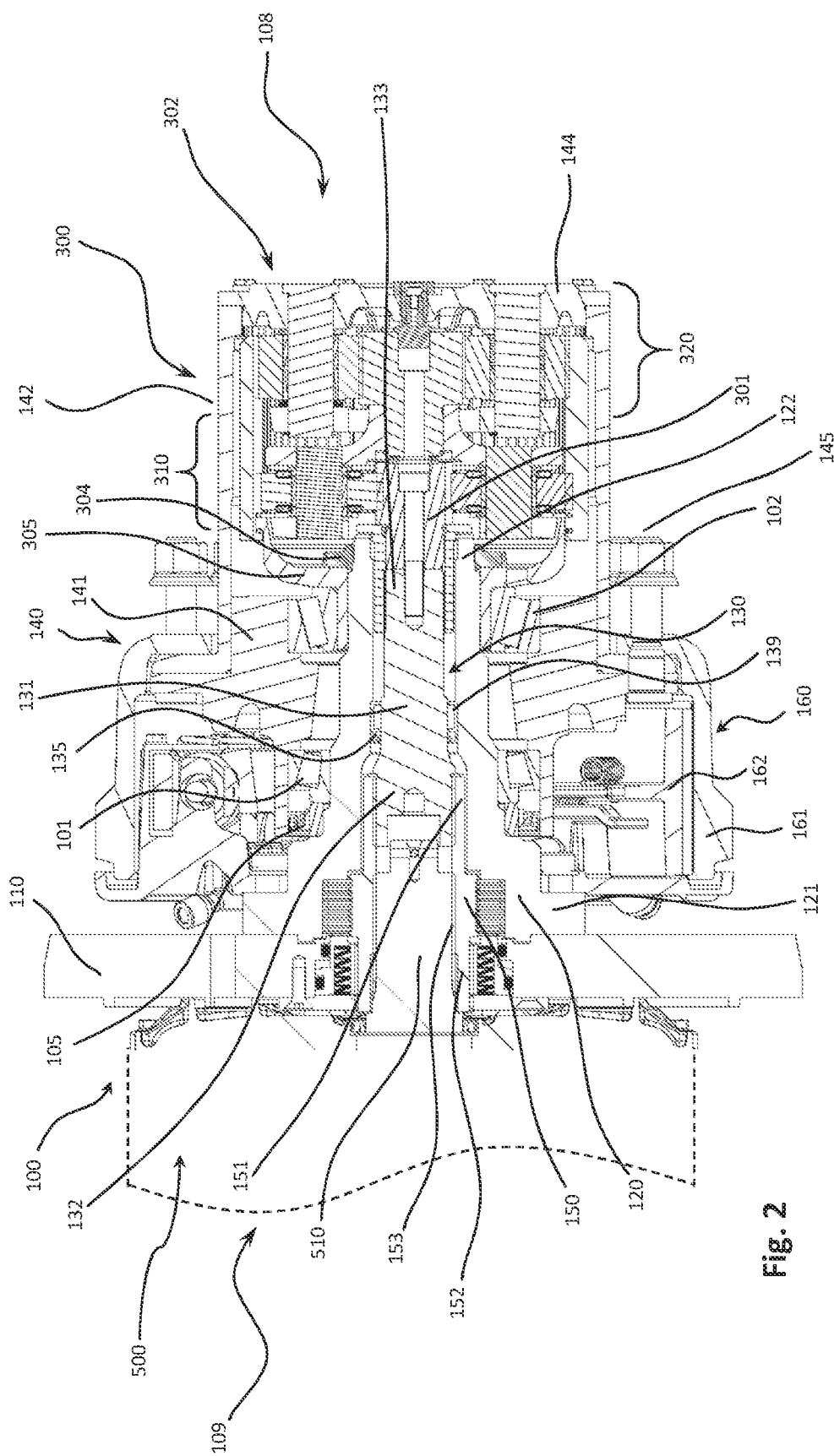
FIG. 2 shows a cross-section through a wheel end assembly of the present disclosure.

FIG. 2 illustrates an example of an electric wheel end assembly 100 according to the present disclosure. The wheel end assembly 100 is arranged to transmit drive from an electric motor 500 to a hub 140, via a gearbox 300. The gearbox can reduce the rotational speed and increase the torque delivered to the hub 140, as compared to that delivered directly from the output 510 of electric motor 500.

Hub 140 is rotatably mounted to a spindle 120. The hub 140 may be mounted to the spindle via one or more hub bearings 101, 102. The hub bearings may comprise an inboard hub bearing 101 and an outboard hub bearing 102. The inboard and/or outboard hub bearings 101, 102 may be mounted to the spindle 120 between an inboard end 121 of the spindle and an outboard end 122 of the spindle. In the present description, the terms inboard and outboard are used in a conventional manner with regard to vehicles and hub assemblies. Therefore, the wheel end assembly may have an outboard side 108 and an inboard side 109. The inboard side 109 is nearer to a centerline of the vehicle to which the wheel end assembly is to be mounted, while the outboard side 108 is arranged further from the centerline of the vehicle, such that the outboard side 108 faces outwardly, away from the centerline.

At or toward its inboard end 121, the spindle 120 is connected to a mounting portion 110. Mounting portion 110 may take the form of a mounting plate. The spindle 120 may be connected to the mounting portion 110 in a removable manner, such as by being removably attached to the mounting plate via removable attachment means such as bolts, screws or rivets, or any other means of attachment which allows disassembly of the spindle from the mounting plate 110 in a repeatable manner without damage to the spindle or mounting portion/plate 110. The spindle may alternatively be integrally formed with the mounting portion 110, such as by being formed from a unitary piece of material with the mounting portion 110, or by being permanently attached e.g., by welding or other permanent attachment methods, thereto.

An electric motor 500 may be mounted to the mounting portion 110. The mounting portion 110 may comprise suitable surface features for engaging a body of the electric motor to prevent relative rotation between the electric motor 500 and the mounting portion 110. The electric motor 500 may be secured to the mounting portion 110 by removable fixing means such as bolts. The electric motor may comprise an output shaft 510 for delivering an input torque to the input shaft 130. The input shaft 130 can extend through a bore of the spindle 120 to transmit a rotational drive from the motor output at an inboard end of the spindle 120 to a gearbox 300 at an outboard end of the spindle 120. The gearbox 300 comprises a plurality of gears arranged so as to provide a reduction ratio which reduces the rotational speed and increases the torque received from the end of 500. The gearbox 300 may take any suitable form and in certain implementations a speed increasing gearbox may be implemented if desired. The gearbox 300 comprises a plurality of gears configured to mesh to provide the desired increase or reduction ratio between the input shaft 130 and the hub 140. The illustrated embodiment shows a reduction gearbox.

The input shaft 130 therefore delivers a drive input from the motor output 510 to drive input 301 of the gearbox 300. A drive output 302 of the gearbox can be connected to the hub 140 to deliver a rotational drive to the hub 140. In the illustrated example, the drive output 302 is connected to, or may be integrally formed with, an end cap 144 of the hub 140. The input shaft 130 is connected to the drive input 301 of the gearbox 300 at an outboard end 133 of the input shaft. The input shaft 130 may comprise an outboard portion 131. At an inboard end 152, the input shaft 130 may comprise a drive receiving portion 153 configured to engage with and receive a drive from the motor output 510. The illustrated drive receiving portion comprises a bore arranged to receive a motor output shaft 510. However, embodiments may be envisaged in which the drive receiving portion comprises a shaft projecting from the mounting portion 110 and configured to be received in a corresponding bore of an output of a motor 500. These features permit the input shaft to receive a drive input from the electric motor 500, to transmit that drive input through a bore of the spindle 122 the gearbox 300. The input shaft 130 may be divided into two sections, and outboard portion 131 and a coupling sleeve 150. The drive receiving portion 153 may be formed in the coupling sleeve 150. The outboard portion 131 may comprise an inboard end 132, which may be configured to engage an outboard end 151 of the coupling sleeve 150. The outboard portion 131 and the coupling sleeve 150 may be engaged via a linearly slidable connection, for example a toothed connection, such as a spline. This enables the coupling sleeve 150 to be slid onto an end of the input shaft 130 within the spindle 120, such that drive can be transmitted between the coupling sleeve 150 and the outboard portion 131. This arrangement allows flexibility of the assembly, to receive a range of coupling sleeves, which can be configured to receive a range of motor types of different configurations and output configurations, for example.

The input shaft 130 may be rotatably supported within the spindle 120 by at least one input shaft bearing 139. The input shaft bearing or bearings may be located between inboard and outboard ends of the input shaft 130. In the illustrated embodiment one input shaft bearing is illustrated, however embodiments are envisaged in which a plurality of bearings, axially spaced along the length of the input shaft are implemented. An input shaft oil seal 135 may further be provided. The input shaft oil seal 135 may be located so as to provide a seal between the input shaft 130 and the bore of the spindle 120. The input shaft oil seal 135 may be located so as to prevent oil flow from the gearbox 300 to the inboard end 152 of the input shaft 130. Advantageously, the oil seal can be located on the outboard portion 131 of the input shaft. This can permit the integrity of the oil seal to be maintained while removing or replacing the coupling sleeve 150 and/or any components connected to it, such as the braking arrangement described later in relation to FIG. 4.

The wheel end 100 of the present disclosure achieves a compact overall arrangement, combined with advantageous load bearing capacity and a higher reduction ratio than has previously been required of implemented in such a small overall envelope. Factors which contribute to this include the arrangement of the gear box and its gears outside of the end of the spindle 120. In particular, the gearbox is arranged to an outboard side 108 of the hub bearing or bearings 101, 102. Only the input shaft and its bearing(s) 139 and/or oil seal 135 are located within the spindle 120, allowing a small overall diameter to be achieved for the arrangement. In certain examples, the ratio of the outer diameter of the spindle to the outer diameter of the input shaft 130 is less than 3 to 1 and more preferably less than 5 to 2, and may be 2 to 1 or less. These conditions are preferably met at the location on the spindle where the hub bearings are mounted to the spindle. Advantageously, a single input shaft passing through a bore of the spindle 120 can transfer a drive to the wheel end gearbox 300, to permit a reduced diameter of spindle 120 as compared to other known arrangements.

Turning to the hub 140, the hub may comprise a hub body 141. The hub body may be mounted to the spindle via the one or more bearings 101, 102. The hub body may be connected to a hub casing 142. The hub casing 142 may act as a casing for the gearbox 300. A hub oil seal 105 may provide a seal between the hub 140 and the spindle 120. As described above, the drive output 302 of the gearbox 300 may be transmitted to the end cap 144 of the hub 140. Torque may be transmitted from the end cap 144 through the hub casing 142 to the hub body 141. The torque may be transmitted to wheels attached to the hub by one or more wheel connection points 145, which may take the form of the illustrated studs and nuts, or which may be implemented via other known wheel connection means, such as bolts fixed to suitable threaded holes in the hub body 141, or other attachment means removably fixing a wheel to the hub.

A service brake 160 may be provided, to brake the hub 140 with respect to the spindle 120. A brake rotor 161 may be provided and mounted in fixed relation to the hub 140. In the illustrated example, the brake rotor 161 is a drum, although embodiments can be envisaged in which a dry disc brake or a wet disc brake is implemented, and in which the brake rotor 161 would take the form of a brake disc or a wet disc brake assembly. In the usual way for a drum brake, a friction member 162, such as a brake shoe, may be mounted in non-rotating relation to the spindle 120, so that the friction member 162 does not rotate about the axis of spindle 120. Actuation means for actuating the friction member to engage the brake rotor can be provided in the usual way. In the case of a dry disc brake, the friction member(s) would be provided in the form of brake pads, which can be actuated to engage the brake disc. In the case of a wet disc brake, the friction members would be provided in the form of immersed friction discs fixed to the hub body 141, which can be actuated to engage one or more non-rotating discs mounted into an additional carrier fixed on the spindle 120. The wet disc brake product such as that currently sold under brand name Axletech™ W3H, W4H or W4R can be adapted for use in the arrangements described herein for the purpose of implementing a wet disc brake. The implementation of such disc or drum brakes will be readily understood by the skilled reader in light of the present disclosure and so are not described in detail herein for efficiency of the disclosure A ring gear support 305 may be provided, and can be retained in place on the spindle 120 by a retainer 304, such as a threaded nut. The support 305 retains the ring gear 306 in fixed relation to the spindle 120, such that torque can be transmitted through the gearbox 300 by engagement of gears of the gearbox with the ring gear 306. The input shaft 130 may be rotatably supported in a bearing or bush 307 at or adjacent the outboard end 122 of the spindle 120.

Figure 3:
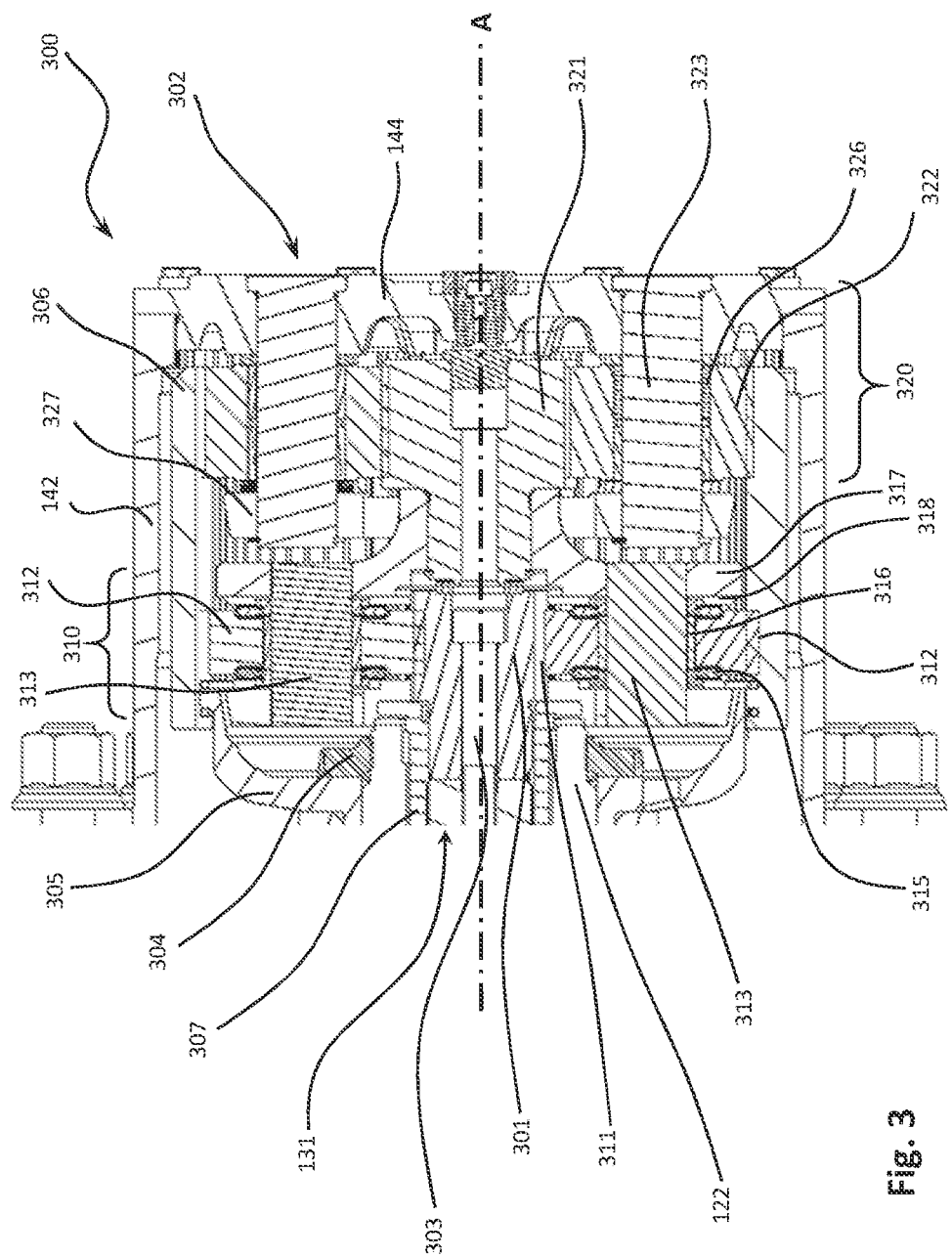
FIG. 3 shows detail of a treat reduction gearbox of the present disclosure.

Details of the arrangement of the gears of the gearbox 300 will be explained in relation to FIG. 3. FIG. 3 illustrates further details of an exemplary gearbox 300, which may be implemented with the wheel end assembly disclosed in relation to FIG. 2. Although embodiments in which alternative forms of gearbox are implemented can be envisaged, preferred examples include a planetary reduction gearbox. It can be advantageous to use a two-stage planetary reduction gearbox. A two-stage planetary reduction gearbox of the kind described in relation to the present disclosure can enable a particularly beneficial range of reduction ratios to be achieved within a compact size, whilst transmitting the desired level of torque.

In the example illustrated, the outboard portion 131 of the input shaft 130 is connected to the drive input member 301 of the gearbox 300. The connection can be made at an outboard end 133 of the input shaft. The first stage 310 may comprise first stage planet gears 312 arranged to orbit the axis A of the gearbox relative to the spindle 120. Ring gear 306 may be mounted in stationary relation to the spindle 120. The drive input member 301 comprises a first stage sun gear 311. The first stage sun gear 311 is arranged to engage first stage planet gears 312, which also engage teeth of an outer ring gear 306. Rotation of the first stage sun gear 311 causes the planet gears 312 to rotate in relation to the ring gear 306, causing the first stage carrier 317 to rotate about the axis A of the gearbox 300. The first stage planet gears 312 are arranged to rotate about first stage planet shafts 313. First stage planet shafts 313 are mounted in the first stage carrier 317 and cause the first stage carrier 317 to rotate about the axis A when the sun gear of the first stage sun gear 311 causes the first stage planet gears 312 to rotate about their respective shafts 313. The first stage carrier 317 can transmit torque from the input shaft 130 to the hub 140 of the wheel end assembly, which may preferably be transmitted via the second stage 320.

A second stage planetary gearbox 320 may be provided. The output of the first stage carrier 317 may be connected to the drive input of the second stage 320. Second stage 320 may comprise a second stage input member 321 comprising a sun gear. The second stage 310 may comprise second stage planet gears 322 arranged to orbit the axis A of the gearbox relative to the spindle 120. The sun gear 321 of the second stage engages planet gears 322 of the second stage, which in turn engage ring gear 306. Planet gears of the first and second stages may therefore engage a common ring gear 306. The ring gear 306 may have a common pitch circle diameter for engagement with both the first stage planet gears 312 and the second stage planet gears 322. Second stage planet gears 322 are arranged to rotate about second stage planet shafts 323. Second stage planet shafts 323 are mounted in the second stage carrier 327 and may cause the second stage carrier 327 to rotate about the axis A when the sun gear of the second stage input member 321 causes the second stage planet gears 322 to rotate about their respective shafts 323. The second stage carrier 327 can therefore transmit torque from the input shaft 130 to the hub 140 of the wheel end assembly. The second stage carrier 327 may be integrally formed with an end cap 144 of the hub 140. The hub casing 142 may transmit torque between the hub body 141 and the end cap 144.

It will be appreciated that alternative arrangements may be implemented in which the first stage 310 is omitted as a single stage planetary gearbox is implemented to transmit torque from the input shaft 130 the hub 140. This will of course reduce the range of ratios available as compared to a two-stage planetary gearbox, but can reduce the axial length of the gearbox.

The input shaft may therefore directly drive the first stage where present, or directly drive the second stage illustrated, if the first stage 310 is omitted. The stage immediately connected to the input shaft 130 experiences the highest rotational speeds. In the illustrated gearbox, the first stage planet gears 312 are axially spaced from the first stage carrier 317 by thrust bearings 315. This can enable the gearbox 300 to run with higher input speeds, which can result in higher output speeds whilst achieving the desired torque, by virtue of the high reduction ratio, which can be provided by the two-stage reduction gearbox. Shims 318 may be provided in between the first stage planet gears 312 and the first stage carrier 317. The shims 318 may be provided in between the thrust bearings 315 and the first stage carrier 317. These shims may be toughened or hardened as compared to the material of the first stage carrier 317. This can be achieved by heat treatment or hardening treatments of the shims, or by choosing a material of a greater hardness than the material of the first stage carrier. This enables materials of suitable weight and structural properties to be selected for the first stage carrier, while the shims 318 can provide improved resistance to wear and heat generation for the higher speed first stage 310 of the gearbox 300.

The first stage planet gears 312 may be mounted to the first stage planet shafts 313 by bushes or bearings 316. Similarly, the second stage planet gears 322 may be mounted to 2nd stage planet shafts 323 via bushes or bearings 326.

To facilitate assembly of the first stage drive input member 301 to the input shaft 130, a removable attachment means such as a bolt 303 may be provided to retain the drive input member 301 to the input shaft 130.

Figure 4:
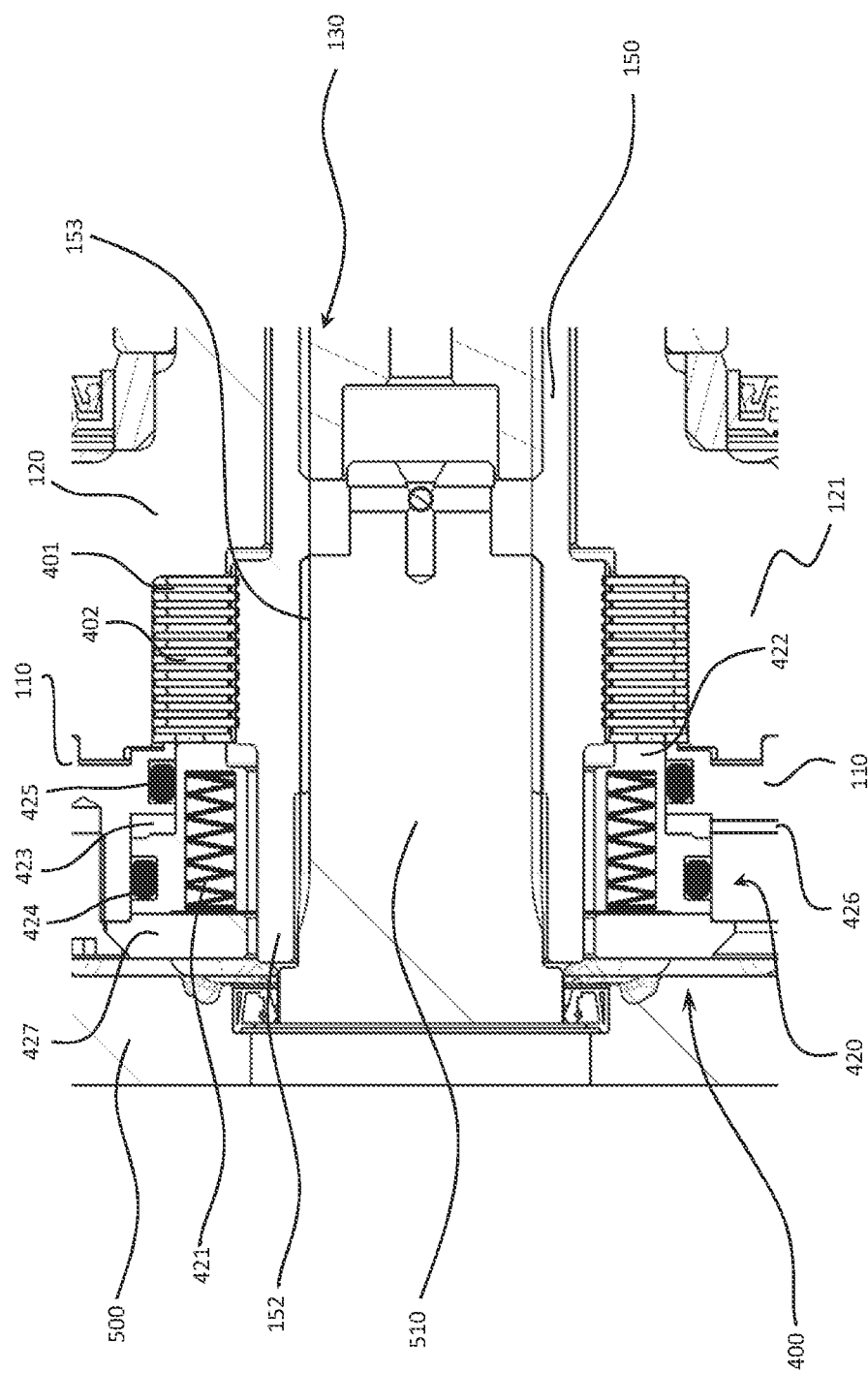
FIG. 4 shows detail of a braking arrangement of the present disclosure.

FIG. 4 shows an enlarged cross-section of an input braking assembly 400 which may be incorporated into the wheel end assembly 100 of the present disclosure. The input braking assembly 400 may be at least partly received in the spindle 120, preferably within a bore within the spindle 120. The input braking assembly 400 may be at least partly received in the mounting portion 110. As described previously, and seen in greater detail in FIG. 4, the spindle 120 can in some embodiments be integrally formed with mounting plate 110, or may be a separate component to the mounting plate 110. In use, an electric motor 500 can be mounted to the mounting portion 110 and a drive input from its output 510 can be applied to the drive receiving portion 153 of the coupling sleeve 150. The coupling sleeve 150 may in certain embodiments be integrally formed with the outboard portion 131 of input shaft 130. However, having a separately formed coupling sleeve 150 can allow the coupling sleeve to be easily replaced without a need to interfere with the remainder of the wheel-end assembly, which improves the flexibility of the wheel end arrangement for use with different motor types and also facilitates maintenance and replacement of the wheel end assembly and/or motor.

The input braking assembly 400 provides a means for braking the input shaft 130 with respect to the spindle. When considered in conjunction with the optional service brake 160 described in relation to FIG. 2, it will be appreciated that the wheel end assembly may therefore comprise a plurality of braking mechanisms 160, 400. A first braking mechanism may be a service brake 160 arranged to directly brake the hub 140 with respect to the spindle 120. Such a brake being in direct communication with the hub and 40 and mounted to the spindle 120 can provide a relatively high braking force to provide sufficient braking torque for use in service, such as to bring a vehicle to a stop during normal operation. Therefore, if power assistance is available during use of the vehicle for such a service brake, then direct braking of hub 140 can be achieved. On the other hand, it may be desirable to have a brake 400, which can be actuated with a relatively low actuation force. This may be of particular use when the vehicle is not in use and power assistance is not available, for example as a parking brake. By applying a parking brake at an input shaft of the wheel end assembly, the braking force at the input shaft, and its corresponding braking torque, are amplified through the ratio of the gearbox before reaching the hub 140 and so a braking assembly having a lower braking force and lower braking torque at the input shaft can be of benefit for braking the hub 140. This can be particularly beneficial when implemented as a parking brake for a vehicle. Alternatively, the input braking assembly 400 may be implemented without the service brake 160. The input braking assembly can be used as both a parking brake and a service brake. When used as a service brake, the brake may be actively actuated with a piston arranged to provide positive pressure to actuate the braking assembly, either as an alternative to or in addition to the "normally on" arrangement described in more detail below.

The input braking assembly 400 may comprise one or more static braking members 401. In this context, the term static is intended to mean non-rotating. However, the static braking members 401 may not be completely static with respect to the spindle 120, since it is preferable that they are able to move axially with respect to the spindle 120 and the input shaft 130 in order to provide for the axial actuation and the release of the braking assembly 400, by compression and release of the braking members 401, 402. The one or more static braking members 401 can be arranged to engage movable braking members 402. Movable braking members 402 are mounted to the input shaft 130. They may be mounted to the input shaft 130 at the coupling sleeve 150. The movable braking members 402 may be attached to the input shaft 130 so as to permit them to move axially with respect to the input shaft 130, while being held in a fixed rotational configuration with respect to the input shaft 130. This can be achieved by attaching them via a spline arrangement. This axial freedom of movement can enable the movable braking members 402 to be axially compressed against static braking members 401 when the brake is activated. Frictional engagement between the movable 402 and static 401 braking members therefore provides a braking force to the input shaft 130 with respect to the spindle 120.

An actuating means 420 is provided to actuate the input shaft braking assembly 400. The actuating means 420 is preferably arranged to apply an axial compressive force to the static and movable braking members 401 and 402. The actuation means 420 may comprise a biasing means 421, such as spring. The biasing means 421 may bias the input braking assembly to an engaged or disengaged configuration. In the illustrated arrangement, the biasing means 421 is configured to provide an axially compressive force toward the braking members 401, 402 to bias the input braking assembly to an engaged configuration. This arrangement can be considered a "normally on" brake. A further actuating means can be provided to counteract the actuating force of the biasing means 421. Such further actuating means can be arranged to provide an opposing force to the biasing means 421. In the illustrated embodiment, a piston arrangement is illustrated. A chamber 423 is provided, which, when provided with an actuating pressure, can provide an axial force in an opposite direction to biasing means 421. In the particular example illustrated, by providing pressure to chamber 423, preferably via a pressure inlet 426, the piston 422, which may be annular, is biased away from the braking members 401 and 402 to place the braking arrangement in a disengaged configuration. A first seal 425 and a second seal 424 may be located at either side of chamber 423 to avoid leakage of pressurized fluid from the chamber, particularly when pressurized during actuation. It is possible to operate the input braking arrangement 400 as a service brake in the 'normally on' arrangement described, by controlling the pressure in opposite relation to the required braking force. In such an arrangement, the pressure provided to the piston is reduced as an increased braking force is required. When no pressure is provided, the brake is at maximum braking force and when sufficient pressure is provided to overcome the biasing means 421, then no braking force is provided to compress the braking members 402. A normally on braking arrangement can therefore be provided at the input shaft, which may be arranged to be used as a service brake.

In certain embodiments, such as in the illustrated example, the movable braking members may be mounted to the coupling sleeve 150, whereas in others they may be mounted to the input shaft 130. Mounting the braking members to the coupling sleeve further facilitates maintenance of the overall arrangement. When maintenance of the parking brake is required, the coupling sleeve and related braking members can be removed without significant disturbance to the remaining parts of the wheel end assembly, as described earlier. In certain embodiments, the piston 42 may be received in the mounting portion 110, while the movable braking members and static braking members may be received in the spindle 120. Oppositely oriented arrangements can be envisaged, in which the piston 42 may be disposed in the spindle and the braking members 401, 402 are arranged in the mounting portion 110. Therefore, some or all of the braking assembly may be received in the spindle and some or all of the braking assembly may be received in the mounting portion 110. A retainer component 427 may be provided to retain the components of the input braking assembly 400 within the bore of the spindle 120. The retainer component 427 may act as a fixed component against which biasing means 421 may react to bias the piston 422 toward the braking members 401 and 402. Retainer component 427 may be provided as a cover plate, arranged to cover the components of the input braking assembly 400 and retain them within a bore of the spindle 120 and/or mounting portion 110.

Electric wheel end assemblies are therefore disclosed having optimized architectures, which can enable a compact product that is able to carry high loads and transmit high torques. The relative configuration and ease of access to the input shaft enables the end assembly of the present disclosure to be highly adaptable to different input electric motors and also facilitates easy maintenance of such motors and their replacement. The novel braking arrangements described herein further enable efficient provision of suitable braking of the wheel end hub by efficient means, which are also well configured for ease of assembly and maintenance.

Various modifications, whether by way of addition, deletion and/or substitution, may be made to all of the above described embodiments to provide further embodiments, any and/or all of which are intended to be encompassed by the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electric wheel-end assembly comprising:
   a mounting portion;
   a spindle having an inboard end connected to the mounting portion and an outboard end distal from the mounting portion;
   a hub, rotatably mounted to the spindle via one or more bearings disposed between the inboard and outboard ends of the spindle;
   a 2-stage planetary reduction gearbox disposed at the outboard end of the spindle, the 2-stage planetary reduction gearbox including:
      a drive input;
      a drive output;
      a first planetary stage that includes a first sun gear, and a first planet gear rotatably mounted to a first stage planet carrier; and
      a second planetary stage that includes a second sun gear, and a second planet gear rotatably mounted to a second stage planet carrier, the first stage planet carrier being connected to the second sun gear;
   an input shaft having an inboard end having a drive receiving portion arranged to releasably connect to a drive shaft of an electric motor, the input shaft extending through the spindle to deliver a rotational input from the drive receiving portion to the drive input of the 2-stage planetary reduction gearbox, the drive output of the 2-stage planetary reduction gearbox being connected to the hub, to drive the hub in rotation about the spindle; and
   an input braking assembly disposed at least partially within the spindle and arranged to brake the input shaft with respect to the spindle;
   wherein a ratio of an outer diameter of the spindle to an outer diameter of the input shaft at a location where the one or more bearings are mounted to the spindle is less than 3 to 1.

2. The electric wheel-end assembly of claim 1 wherein the input shaft further comprises an outboard end connected to the drive input.

3. The electric wheel-end assembly of claim 2 wherein the input shaft comprises a coupling sleeve and an outboard portion, the coupling sleeve having an outboard end releasably coupled to the outboard portion of the input shaft within the spindle, and an inboard end including the drive receiving portion arranged to connect to the drive shaft of the electric motor.

4. The electric wheel-end assembly of claim 3 further comprising at least one input shaft bearing disposed in a bore of the spindle to rotatably support the outboard portion of the input shaft.

5. The electric wheel-end assembly of claim 4 further comprising an input shaft oil seal disposed in the bore of the spindle, axially between inboard and outboard ends of the outboard portion of the input shaft, and arranged to provide a seal between the outboard portion of the input shaft and the spindle.

6. The electric wheel-end assembly of claim 1 wherein the first planetary stage has an axial thrust bearing arranged between the first planet gear and the first stage planet carrier, or the second planetary stage has an axial thrust bearing arranged between the second planet gear and the second stage planet carrier, or the first planetary stage has an axial thrust bearing arranged between the first planet gear and the first stage planet carrier and the second planetary stage has an axial thrust bearing arranged between the second planet gear and the second stage planet carrier.

7. The electric wheel-end assembly of claim 1 wherein the first planetary stage has an axial thrust bearing arranged between the first planet gear and the first stage planet carrier and a shim is arranged between the axial thrust bearing of the first planetary stage and the first stage planet carrier, the shim having a hardness greater than that of the first stage planet carrier.

8. The electric wheel-end assembly of claim 1 wherein the second planetary stage has an axial thrust bearing arranged between the second planet gear and the second stage planet carrier and a shim is arranged between the axial thrust bearing of the second planetary stage and the second stage planet carrier, the shim having a hardness greater than that of the second stage planet carrier.

9. The electric wheel-end assembly of claim 1 wherein the input braking assembly comprises:
   a static braking member mounted within a bore of the spindle;
   a rotatable braking member mounted to the input shaft; and
   an actuator arranged to actuate the static and rotatable braking members to brake the input shaft with respect to the spindle.

10. The electric wheel-end assembly of claim 1 wherein the input braking assembly is a normally on type brake.

11. The electric wheel-end assembly of claim 9 wherein the actuator comprises a biasing member arranged to bias the input braking assembly toward an engaged position and the actuator is further arranged provide a force opposing the biasing member, to release the input braking assembly.

12. The electric wheel-end assembly of claim 9 wherein the actuator comprises an annular piston arranged about the input shaft.

13. The electric wheel-end assembly of claim 12 wherein the annular piston is slidably received in a bore within the mounting portion, and the actuator further comprises a fluid chamber arranged to actuate the annular piston when pressure is applied within the fluid chamber.

14. The electric wheel-end assembly of claim 1 wherein the input braking assembly and the inboard end of the spindle and mounting portion are arranged so that the input braking assembly can be assembled by introducing components of the input braking assembly axially into a bore of the spindle from the inboard end.

15. The electric wheel-end assembly of claim 14 wherein the components are retained in place by a retainer component applied at the inboard end of the spindle and mounting portion.

16. The electric wheel-end assembly of claim 3 further comprising at least one input shaft bearing disposed in a bore of the spindle to rotatably support the outboard portion of the input shaft, the input shaft bearing being disposed axially between inboard and outboard ends of the outboard portion.

* * * * *